UNITED STATES PATENT OFFICE.

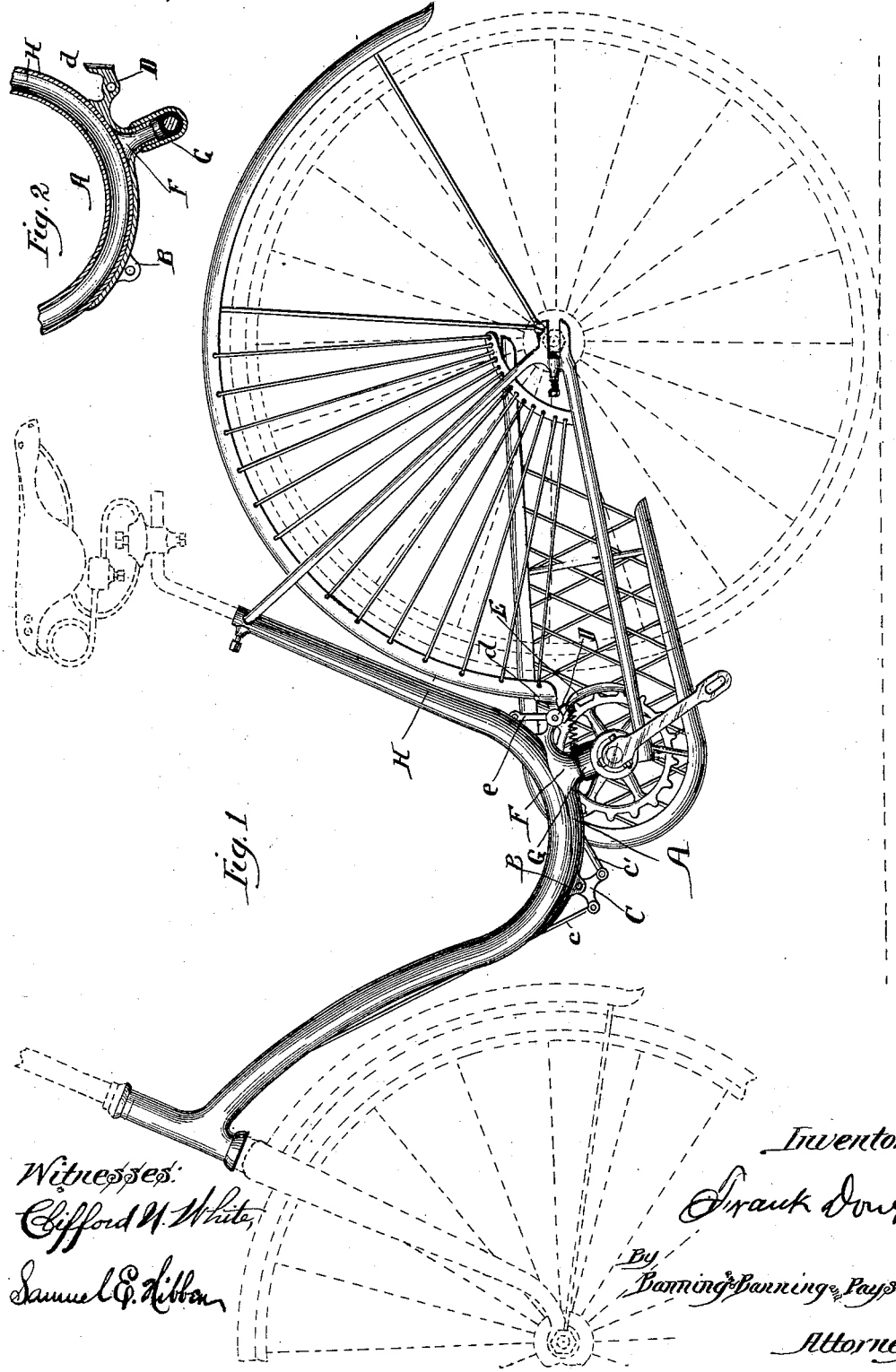

FRANK DOUGLAS, OF CHICAGO, ILLINOIS.

BICYCLE.

SPECIFICATION forming part of Letters Patent No. 469,630, dated February 23, 1892.

Application filed October 5, 1891. Serial No. 407,775. (No model.)

*To all whom it may concern:*

Be it known that I, FRANK DOUGLAS, a citizen of the United States, residing at Chicago, Illinois, have invented certain new and useful Improvements in Bicycles, of which the following is a specification.

The particular object of my invention has relation to a strengthening-shoe arranged at the curb of the main or U bicycle-frame and affording points of attachment for various parts, as hereinafter described; and it consists in the features and details of construction hereinafter described and claimed.

In the drawings, Figure 1 is a side elevation of parts of a bicycle, showing my improvements; and Fig. 2 is a longitudinal vertical section of the shoe.

In order to strengthen the main or U frame of a bicycle at its lowest or most curved portion, where the greatest strength is required, and to afford points for attachment of various parts, I make a shoe A of a proper shape to fit the curve of the frame. This shoe may be made of steel tubing or of other material. I braze or otherwise securely fasten it to the frame, and prefer to extend its ends to mostly embrace the lower curve of the main frame in each direction. Toward its forward end I provide a lug B for the attachment of a bell-crank C, to which the brake connections $c$ $c'$ are attached. Toward the rear end of the shoe I provide a lug D, with an eye in it, and pivot or fulcrum the brake E therein. The brake is provided with a brake-arm $e$, that is pivotally connected to the rear end of the rear connection $c'$, so that as the brake-lever is moved to apply the brakes the connection $c$ will be drawn up, the connection $c'$ will be drawn forward through the instrumentality of the bell-crank C, the brake-arm $e$ drawn forward, and the brake E applied to the surface of the wheel. I provide a projection F, extending downward from the shoe to afford a connection for the crank-shaft sleeve G, which carries the ball-bearings and the pedal-cranks. This sleeve may be brazed or otherwise securely fastened to the downward projection F. The lug D is provided with an inwardly-extending flange or projection $d$, to which the forward end of the mud-guard H is attached by brazing or in any other suitable manner.

What I regard as new, and desire to secure by Letters Patent, is—

1. A shoe for strengthening the main frame of a bicycle, provided with lugs for the brake connections, substantially as described.

2. A shoe for strengthening the main frame of a bicycle, provided with lugs for the brake connections and a projection for the attachment of the pedal-crank sleeve, substantially as described.

3. A shoe for strengthening the main frame of a bicycle, provided with lugs for the attachment of the brake connections, bell-crank, the brake, and the pedal-crank sleeve, substantially as described.

4. In combination with the main frame of a bicycle, a shoe for strengthening the same and affording points of attachment for various parts, substantially as described.

FRANK DOUGLAS.

Witnesses:
THOMAS A. BANNING,
ANNIE C. COURTENAY.